June 2, 1936.  A. HENDERSON  2,042,463
STRUCTURAL STEEL MEMBER
Filed April 21, 1934
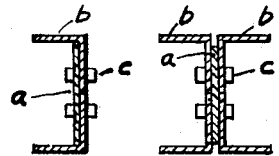
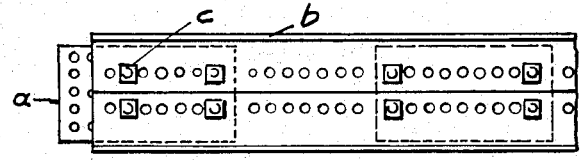
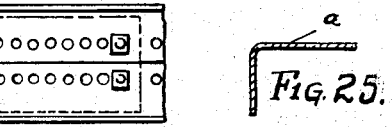
Fig. 6.  Fig. 5.  Fig. 4.  Fig. 25.
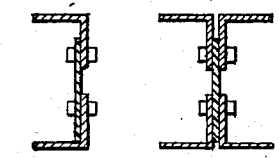
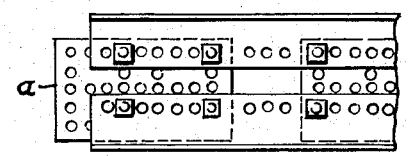
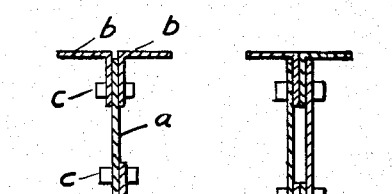
Fig. 9.  Fig. 8.  Fig. 7.  Fig. 23.
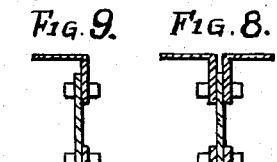
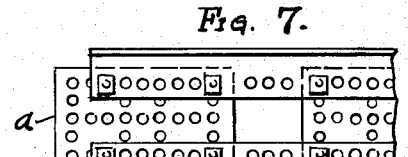
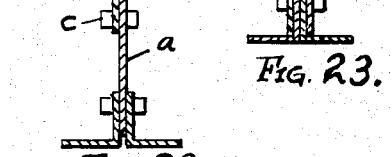
Fig. 12.  Fig. 11.  Fig. 10.  Fig. 22.
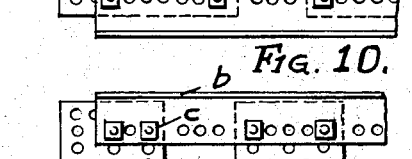
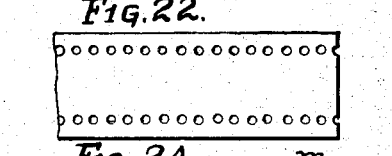
Fig. 15.  Fig. 14.  Fig. 13.  Fig. 24.
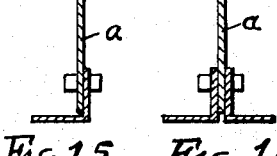
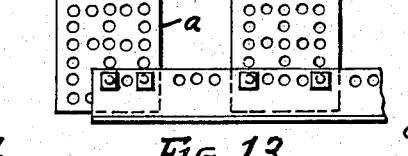
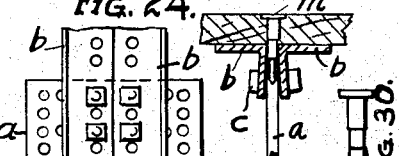
Fig. 18.  Fig. 17.  Fig. 16.  Fig. 29.  Fig. 30.  Fig. 31.
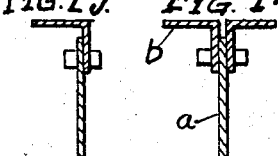
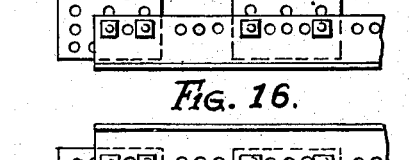
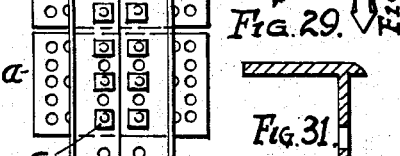
Fig. 21.  Fig. 20.  Fig. 19.  Fig. 26.
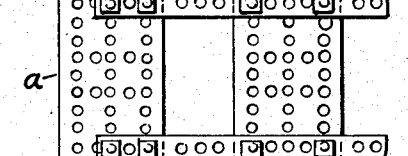
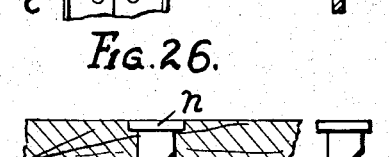
Fig. 27.  Fig. 28.
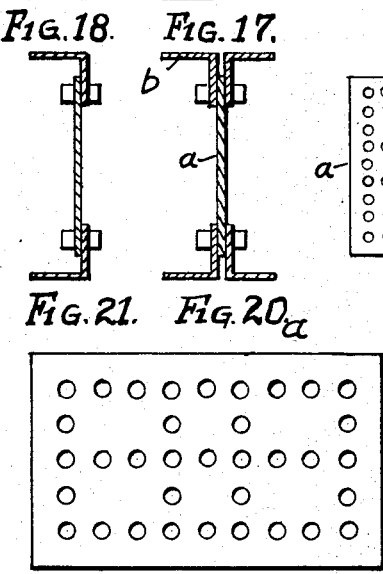
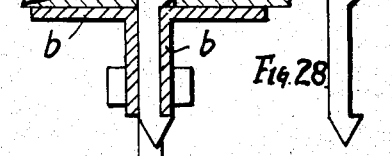
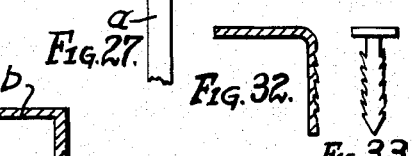
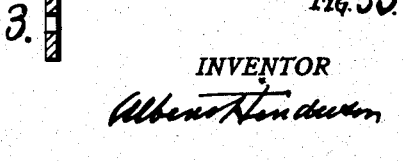
Fig. 1.  Fig. 2.  Fig. 3.  Fig. 32.  Fig. 33.
INVENTOR
Albert Henderson Patented June 2, 1936

2,042,463

UNITED STATES PATENT OFFICE 2,042,463

STRUCTURAL STEEL MEMBER

Albert Henderson, Pittsburgh, Pa.

Application April 21, 1934, Serial No. 721,734

10 Claims. (Cl. 189—37)

My invention relates to structural steel members wherein channels and I beams of many different depths are built up from multiples of a single sized angle and multiples of a single sized plate. These members form various structures such as outlined in my copending application Serial Number 714,243 filed March 6, 1934, for a Structural steel system.

In that application, I have described and claimed broadly, a series of structural members formed of combinations of angles of the same shape, and web plates having a common difference of dimensions.

The object of this invention is to reduce the cost of steelwork through simplification and thereby displace wood structures. Another object of my invention is to provide an improved nailing means for securing floor, ceiling and wall elements to steel members.

Some of the forms my invention may take are shown in the accompanying drawing wherein Figure 1 is a face view of the plate; Figure 2 is a face view of the angle and Figure 3 is an end view of the angle, on an enlarged scale. Figures 4 to 21 show channels and I beams built up from the plate in Figure 1 and the angle in Figure 2; Figures 4, 7, 10, 13, 16 and 19 being side views of the channels and I beams. Figure 22 shows an end view of a member built up with spliced web plates and Figure 23 is an end view of a steel member having the plates outside the angle and their ends coacting with the horizontal legs of the member. Figure 24 is a face view of a perforated plate which can be cut to suit any depth member. Figure 25 is a top view of the plate bent to form a connection angle. Figure 26 is an elevation of two angles and two plates forming a column with connection means on both sides of the column. Figure 27 is a section showing a floor or wall element secured to a steel member. Figure 28 is an elevation of a form of nail used in Figure 27. Figure 29 is a section of a floor or wall element secured to a steel member in a modified form. Figure 30 is an elevation of the type of nail used in Figure 29. Figures 31 and 32 are sections of types of angles and may be used for flanges to improve their capacity for holding nails. Fig. 33 shows a modification of the nail of Fig. 28.

Referring in detail to the figures:

Figure 1 shows a metal plate "a" approximately 6" wide and approximately 10" long; ½" diameter holes are spaced 1" on centers; the shorter distance between the outside row of holes center to center being 4" and the longer distance between the other outside row of holes center to center being 8"; all outside rows of holes being from their center lines to the edges of the plate approximately 1". All inside holes between the outside rows are on the center line of the other holes of the outside rows.

Figures 2 and 3 show an angle "b" preferably of the square root type wherein the fillet is omitted and I may use a 3" x 3" as shown. A row of ½" holes are spaced along one leg of the angle on 1" centers; the distance from the center line of holes being 1" from the edge and 2" to the corner of the angle.

Figures 4, 5 and 6 show steel members 6" deep showing spaced plates "a" secured to flange angles "b" by bolts "c". The plate is placed short side up and bolted along the two second rows of plate holes. The plates are spaced along the flange angles to suit the needs of the structure.

Figures 7, 8 and 9 show members 7" deep with the plate as shown in Figures 4, 5 and 6. The flange angles being bolted to a second and an outside row of holes in the plates "a".

Figures 10, 11 and 12 show members 8" deep with plate as shown in Figures 4, 5 and 6. The flange angles being bolted to the ouside rows of holes in the plates "a".

Figures 13, 14 and 15 show members 10" deep with plate reversed to the position shown in Figures 4, 5 and 6. The plate is long side up and the flange angles are bolted to the second rows of holes in the plates "a".

Figures 16, 17 and 18 show members 11" deep with plate as shown in Figures 13, 14 and 15. The flange angles are bolted to a second and an outside row of holes in the plates "a".

Figures 19, 20 and 21 show members 12" deep with plate as shown in Figures 13, 14 and 15. The flange angles are bolted to the outside rows of holes in plates "a".

Figure 22 shows a metal member having flange angles "b" and web plates "a" secured by bolts "c". The web plates are long side up and spliced so that additional depths other than shown may be made. The additional depths are from 13" increasing by 1" up to 19" and if a single row of bolts is used at the splice, a 20" member may be built. The web plates are spaced along the flanges.

Figure 23 shows a built up member with web plates outside the flange angle legs, the flange angles being back to back. The ends of the plates contact the inside surface of the horizontal legs of the flange angles. These plates may be double as shown or single and staggered. This method of placing the plates as shown increases the strength of the horizontal legs of the flange angles. It also makes a more rigid member. These plates may be welded to the flange angles or they may be bolted as shown. Channels as well as I beams can be made like this as shown in Figures 6 and 15.

Figure 24 is a plate having spaced ½" holes on 1" centers along both longitudinal edges. These plates may be cut to lengths to suit any depth of member. In many cases no further punching of holes will be necessary as cutting across the plate provides a plate with holes adjacent the four corners which are sufficient when bolts or rivets connect through them to the flanges. A series of members as shown of different depths can be made from these subdivided plates using the corner holes. The holes in the flanges match the corner holes and the vertical distance between the spaced parallel corner holes varying in height by the same increment as obtains in the series of members. This plate may be bent to form an angle which would form a flange angle having spaced holes along two legs or the plate may be cut along the middle long axis to form two flange angles having only a series of holes in one leg only.

Figure 25 shows plate "a" bent to form a connection angle. These plates may be bent on either axis and make equal or unequal angles.

Figure 26 shows a column member built up from plates "a" and angles "b". Many other types of connections and structures are shown in my said copending application, 714,243 filed March 6, '34 Structural steel system, which plates "a" are capable of forming in conjunction with angles "b".

Figure 27 shows a floor or wall element secured to a metal member The nail "n" is driven between the flanges and between the spaced webs. The flanges are forced apart and as soon as the offset in the nail "n" passes a bolt hole or the bottom of the flange angle as shown the angles snap together and the nail "n" is locked as shown.

Figure 28 shows nail "n", which may be square or flat sided. The sides may be recessed or concave.

Figure 29 shows a floor or wall element secured to a metal member. When the nail "m" is driven down between the flange angles, they are forced apart but the vertical legs of the flange angles open further apart at their lower edge. The flange angles corners move apart less due to the resistance of the horizontal legs of the flange angles. By using an enlarged point on nail "m" a strong connection is made by the nail.

Figure 30 shows nail "m" which may be flat sided or round.

Figure 31 shows a type of flange angle having an offset for the reception of a nail as shown in Figure 28, when placed back to back.

Figure 32 shows a modified type of flange angle having a leg near the corner scarified or scored like small saw teeth for the reception of a nail also scarified on its surface.

Figure 33 shows a nail with a scarified surface for flange angles as shown on Figure 32 or Figure 29.

Before their insertion in the holes, I may dip the bolts in a material that hardens so that the holes are filled entirely so that there is no lost motion in the member and the nut also may be dipped in a like material to prevent their working loose. This material may be any suitable cement and it may not be necessary to dip the nuts as the dipping of the bolts may be sufficient.

While I show angles of a 3" x 3" size, I may use other widths, such as 2¾" x 2", etc. Also I may rivet or weld some of the members. I may use angles for flanges of ⅛", ¼" and ⅜" thickness for light, medium and heavy load members respectively. The plates may be spaced closer or doubled, or plates thicker than ⅛" as shown may be used for web plates.

The scarified angles may be round back angles as shown so that the rounded corners will guide the nails into place between the flange angles. The flange angles may be placed back to back with the web plates outside so that the nails may be driven all along the member.

With the holes spaced 1" centers as shown on plate "a" and angle "b" they will match. It is important to this invention that the distance between the center line of holes in the angle to the corner of the angle be twice the spacing of the holes in the plate, in this case 2".

It is also important that the distance between holes in the plate equal the uniform difference of height of the members of the series which in this case is 1". It is also important that the rows of holes between the four outside rows of holes in the plate be on the center line of the holes of the outside rows of holes. I may use more holes than shown and I may have some additional holes off the center line. The inside holes also should match the holes in the angle.

I claim as my invention:—

1. A structural metal member comprising spaced flange angles each having a row of holes in one leg thereof, and oblong rectangular web plates each having a row of holes adjacent to each of its four edges, the distance from the center line of one row to the center line of the opposite row being greater than the distance between the center lines of the other rows, by an amount equal to twice the distance from the center line of the holes in the angles to the corners of said angles, the holes in the angle legs matching holes in the web plates, both lengthwise and crosswise thereof, and the spacing of the holes in each plate row and the spacing thereof from the edges of the plates each being equal to approximately one-half the distance from the center line of the holes in the angles to the corners of said angles.

2. A series of structural metal members of different depths, comprising flange angles and spaced web plates having holes spaced on one-inch centers adjacent to the edges of the plates with their centers approximately one inch from the edges of the plates, which holes match holes on a leg of each of said flange angles, the center lines of the holes of the flange angles being two inches from the corners of the angles.

3. A series of structural metal members of different depths comprising spaced flange angles, and spaced web plates having a series of holes adjacent to the edges of the plates, matching series of holes along the legs of said flange angles, the distance between the center line of holes in each flange angle and the corner of the angle being twice the spacing of the holes in the plates and angles, and the difference in depths of the members of the series being equal to the spacing of said holes, none of the web plates extending laterally beyond the corners of their associated angles.

4. A structural steel member comprising spaced flange angles each having a row of holes in one leg thereof, and spaced web plates each having a row of holes adjacent to each of two opposite edges and holes between the first-named rows, the rows of holes in the angle legs matching holes in the web plates, and the center-to-center spacing of the holes in the plates and the spacing thereof from the edges of the plates each being equal to approximately one-half the distance from the center line of the holes in the angles to the corners of said angles.

5. A structural metal member comprising spaced flange angles each having a row of holes in one leg thereof, and spaced web plates each having a row of holes adjacent to each of its four edges and matching holes in the angle legs, the center-to-center spacing of said holes in the plates and the spacing thereof from the edges of the plates each being equal to approximately one-half the distance from the center line of the holes in the angles to the corners of said angles.

6. A structural metal member comprising spaced flange angles each having a row of holes in one leg thereof, and spaced web plates each having a row of holes adjacent to each of two opposite side edges, the rows of holes in the angle legs matching the holes in the web plates, the center-to-center spacing of the holes in the plate rows and the spacing thereof from the edges of the plates being equal to approximately one-half the distance from the center line of the holes in the angles to the corners of said angles.

7. A series of structural metal members respectively having 6 inch, 7 inch, 8 inch, 10 inch, 11 inch and 12 inch depths, comprising spaced flange members and spaced web plates, the flange members being provided with holes that match spaced holes in the said web plates, the web plates of the series being of a given size, and the said plates in no case projecting laterally past the longitudinal edges of said flanges.

8. A structural member comprising at least a pair of spaced angles connected by web plates spaced therealong, at least one of said angles having a row of holes uniformly spaced apart and spaced a predetermined distance from the edge of the angle leg which abuts the plates, said plates having a plurality of holes therein arranged in rows parallel to an edge of said plates, the last mentioned rows being spaced different distances inwardly of said edges, the holes in said last mentioned rows matching the holes in the angle leg, the holes in said angle leg being spaced from the vertex of the angle by a distance at least equal to the spacing from an edge of the plates of the second row of holes inwardly of said edge.

9. The invention defined by claim 8 characterized by the holes in said plates being arranged in rows longitudinally and transversely of the plates.

10. The invention defined by claim 8 characterized by said plates being provided with a plurality of parallel rows of holes adjacent at least two opposite edges.

ALBERT HENDERSON.